United States Patent
Coste et al.

(10) Patent No.: US 9,400,338 B2
(45) Date of Patent: Jul. 26, 2016

(54) SEISMIC ACQUISITION SYSTEM-BASED UNMANNED AIRBORNE VEHICLE

(71) Applicant: WESTERNGECO L.L.C., Houston, TX (US)

(72) Inventors: Emmanuel Coste, Houston, TX (US); Kenneth E. Welker, Oslo (NO); Guillaume Daniel Tamboise, Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 315 days.

(21) Appl. No.: 14/027,094

(22) Filed: Sep. 13, 2013

(65) Prior Publication Data

US 2014/0078865 A1    Mar. 20, 2014

Related U.S. Application Data

(60) Provisional application No. 61/724,178, filed on Nov. 8, 2012, provisional application No. 61/702,581, filed on Sep. 18, 2012.

(51) Int. Cl.
*G01V 1/22* (2006.01)
*G01V 1/00* (2006.01)

(52) U.S. Cl.
CPC *G01V 1/223* (2013.01); *G01V 1/00* (2013.01); *G01V 1/003* (2013.01); *G01V 1/22* (2013.01)

(58) Field of Classification Search
CPC ......... G01V 1/00; G01V 1/223; G01V 1/003; G01V 1/22

USPC .................................................. 367/37, 76, 77
See application file for complete search history.

(56) References Cited

U.S. PATENT DOCUMENTS

| 4,621,347 | A | * | 11/1986 | Ostrander | G01V 1/003 367/15 |
| 5,575,438 | A | * | 11/1996 | McGonigle | B64C 39/024 244/118.1 |
| 6,028,817 | A | * | 2/2000 | Ambs | G01V 1/3808 367/16 |
| 6,951,138 | B1 | | 10/2005 | Jones | |
| 2002/0163857 | A1 | | 11/2002 | Bahorich et al. | |
| 2006/0036367 | A1 | | 2/2006 | Brewster | |
| 2009/0168602 | A1 | | 7/2009 | Wilcox et al. | |
| 2012/0182832 | A1 | | 7/2012 | Eperjesi et al. | |

FOREIGN PATENT DOCUMENTS

| WO | 2012036814 | 3/2012 |
| WO | 2012044479 | 4/2012 |

OTHER PUBLICATIONS

Freedom CPU product data sheet, Abicom International, Ltd., 2007, 7 pp.*
International Search Report and Written Opinion of PCT Application No. PCT/US2013/060270 dated Dec. 23, 2013: pp. 1-13.

* cited by examiner

*Primary Examiner* — Daniel L Murphy
(74) *Attorney, Agent, or Firm* — Kevin B. McGoff

(57) ABSTRACT

A system includes a seismic acquisition system that includes a plurality of nodes and further includes an unmanned airborne vehicle. The unmanned airborne vehicle is to be used with the seismic acquisition system to conduct a seismic survey.

17 Claims, 9 Drawing Sheets

SEISMIC ACQUISITION SYSTEM-BASED UNMANNED AIRBORNE VEHICLE

CROSS-REFERENCE TO RELATED APPLICATIONS

This application claims the benefit of U.S. Provisional Patent Application Ser. Nos. 61/724178 filed Nov. 8, 2012 and 61/702581 filed Sep. 18, 2012; both of which are incorporated herein by reference in their entireties.

BACKGROUND

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensor, both hydrophones and geophones, and/or other suitable sensor types.

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In an example implementation, a system includes a seismic acquisition system that includes a plurality of nodes and further includes an unmanned airborne vehicle. The unmanned airborne vehicle is to be used with the seismic acquisition system to conduct a seismic survey.

In another example implementation, a system includes a seismic acquisition system and an unmanned airborne vehicle. The unmanned airborne vehicle includes a seismic sensor and is adapted to fly to a position to deploy the sensor as an acquisition point of the seismic acquisition system.

In another example implementation, a technique includes flying an unmanned airborne vehicle in proximity to a seismic acquisition network and using the unmanned airborne vehicle to communicate with at least one node of the seismic acquisition network.

In yet another example implementation, a technique includes flying an unmanned airborne vehicle to a location on a sea surface and deploying a seismic sensor from the unmanned airborne vehicle to record a reflected signal from a seismic source.

Advantages and other features will become apparent from the following drawing, description and claims.

DETAILED DESCRIPTION

Systems and techniques are disclosed herein, which use an unmanned airborne vehicle, or "drone," with a seismic acquisition system for such purposes as acquiring information about a seismic sensor array or source array; harvesting data acquired by sensor nodes of the system; communicating data to sensor nodes of the system; and troubleshooting problems that occur during the operation of the system. The use of the unmanned airborne vehicle allows access to sensor/source nodes of the seismic acquisition system, which may otherwise be relatively challenging to access using land-based vehicles (for a land-based seismic acquisition system, for example), surface vessels (for a marine-based seismic acquisition system) or manned airborne vehicles.

For example, the seismic acquisition system may be a land-based system (a vibroseis system, as an example) that contains multiple vibrators, or vibration sources, that impact the Earth to produce associated source signals. Various receiver, or sensor, nodes of the seismic acquisition system may be distributed over a relatively large area for purposes of acquiring data that represent sensed reflections of the source signals. The sensor nodes may contain, for example, various seismic sensors (geophones, accelerometers, tilt sensors, magnetometers, gravimeters, electromagnetic (EM) antennae, as examples) as well as clocks, compasses, global positioning satellite (GPS) receivers, data storage devices, and so forth. Due to the relatively large area over which the sensor nodes may be distributed, there may be numerous challenges associated with communicating with the nodes as well as challenges relating to troubleshooting the nodes, determining the location of the nodes, informing the nodes as to their precise locations (so that the nodes may "stamp," or mark the acquired data with location information), and so forth.

Figure 1:
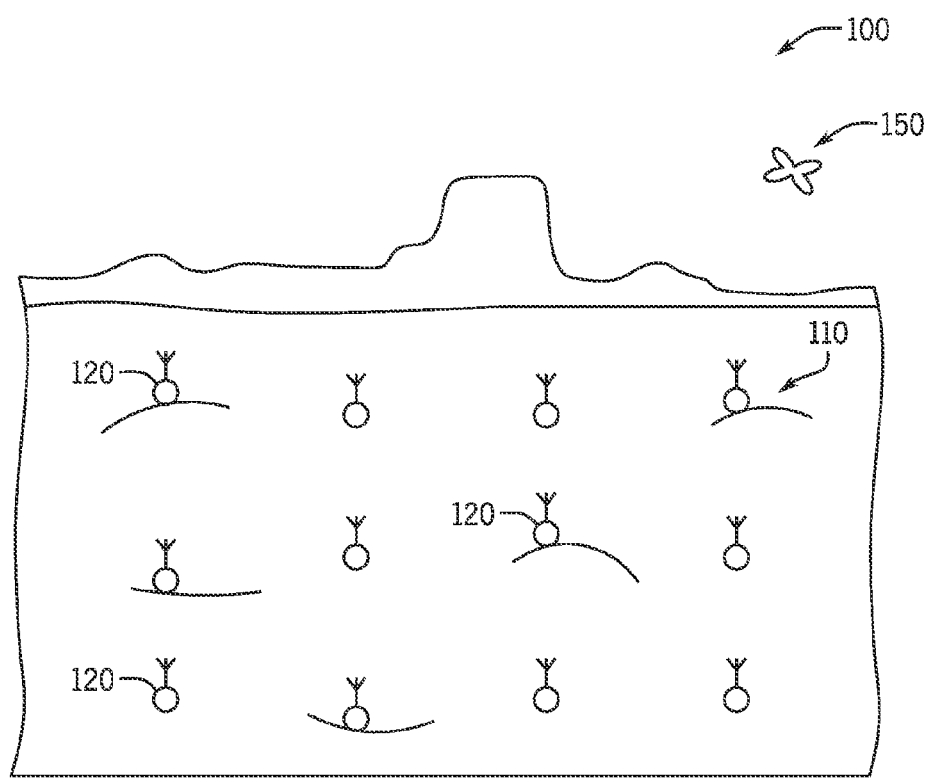
FIG. 1 is a perspective view of a sensor array of a land-based seismic acquisition system according to an example implementation.

As a more specific example that is depicted by an illustration 100 of FIG. 1, an unmanned airborne vehicle 150 may be used for purposes of wirelessly communicating with sensor nodes 120 of a land-based seismic acquisition system 110. In this context, a given node 120 may contain one or more seismic sensors, such as one or more geophones, hydrophones, and so forth, which are associated with a given position of the seismic acquisition system 110.

In accordance with some implementations, some or all of the sensor nodes 120 may have local wireless communication capabilities. For example, in accordance with some implementations, a given node 120 may have a radio that is compliant with the set of physical layer standards for wireless local area networks (WLANs), as described in the Institute of Electrical and Electronics Engineers (IEEE) 802.11 standards and commonly referred to as "Wi-Fi." As a more specific example, groups of the sensor nodes 120 may be connected, for example, by cabling to a Wi-Fi radio shared in common among the grouped nodes 120. In further implementations, each sensor node 120 may contain a Wi-Fi radio. Regardless of the grouping of the nodes 120 and their relationship to Wi-Fi access points, the unmanned airborne vehicle 150 may contain a Wi-Fi radio to communicate with the Wi-Fi radio(s) of the sensor node(s) 120 to exchange data with the sensor node(s) 120 for at least one of the purposes that are disclosed herein.

Thus, the seismic acquisition system 110 may include a wireless network containing seismic acquisition nodes that wirelessly communicate with each other, cable-based seismic sensors that communicate using wired connections, a combination of wired and wireless connections, and so forth.

Figure 2A:
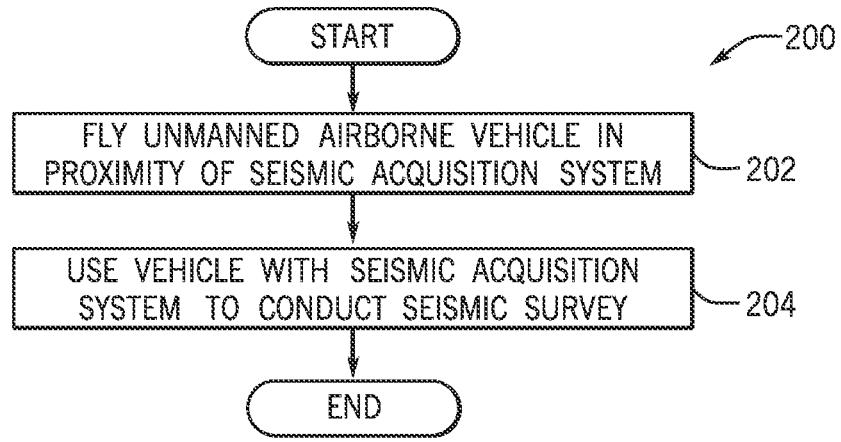
FIG. 2A is a flow diagram depicting a technique to use an unmanned airborne vehicle with a seismic acquisition system according to an example implementation.

More specifically, in general, referring to FIG. 2A in conjunction with FIG. 1, in accordance with example implementations, a technique 200 includes flying (block 202) an unmanned airborne vehicle in proximity of a seismic acquisition system and using (block 204) the unmanned airborne vehicle with the seismic acquisition system to conduct a seismic survey.

Figure 2B:
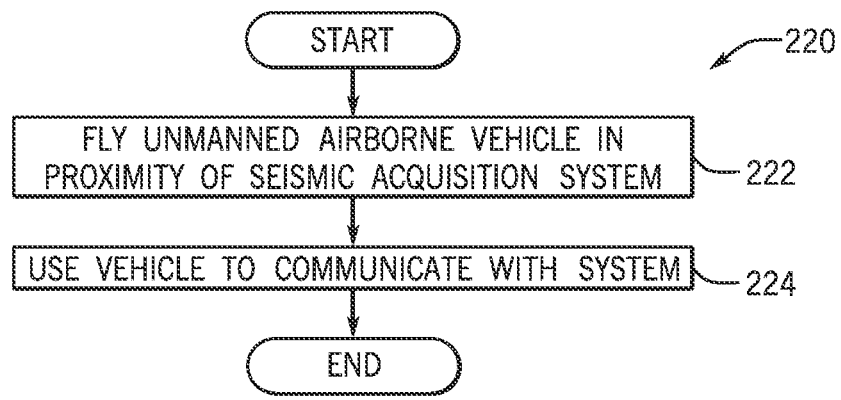
FIG. 2B is a flow diagram depicting a technique to use an unmanned airborne vehicle to communicate with a seismic acquisition system according to an example implementation.

More specifically, in accordance with example implementations that are disclosed herein, the unmanned airborne vehicle may be used to communicate with one or more nodes of the seismic acquisition system. Thus, referring to FIG. 2B in conjunction with FIG. 1, in accordance with example implementations, a technique 220 includes flying (block 222) an unmanned airborne vehicle in proximity of a seismic acquisition system and using (block 224) the unmanned airborne vehicle to communicate with the system. As further disclosed herein, the unmanned airborne vehicle may be used to aid in the seismic survey in ways other than ways that involve communications between the vehicle and the nodes of the seismic acquisition system.

Referring back to FIG. 1, in accordance with example implementations, the unmanned airborne vehicle 150 may autonomously fly according to a predetermined flight path using Global Navigation Satellite System (GNSS)-based navigation waypoints. In this regard, the waypoints may be associated with known or proximate locations within the seismic acquisition network (locations at sufficiently close to Wi-Fi radio(s) of the system 110 for Wi-Fi communications, for example) and locations for guiding the vehicle 150 between a remote home base, or central station (not shown), of the vehicle 150 and the system 110. In accordance with some implementations, the waypoints identify approximate locations of the seismic sensor nodes and/or Wi-Fi radios within the seismic acquisition network. In this manner, by programming data representing the waypoints into the unmanned airborne vehicle 150 (i.e., by storing the data in the vehicle's memory so that the vehicle 150 may autonomously retrieve the data as the vehicle flies), the vehicle 150 may fly in proximity to a given seismic sensor node 120 (within Wi-Fi communication range with the node 120, for example) or group of seismic nodes 12 for purposes of wirelessly communicating with the node(s) 120 to perform a given function, as further set forth herein. Upon completing its function(s), the unmanned vehicle 150 may return to its central station, whose location may be programmed into the vehicle 150 via data representing one or more associated GNSS-based navigation waypoints.

Figure 3A:
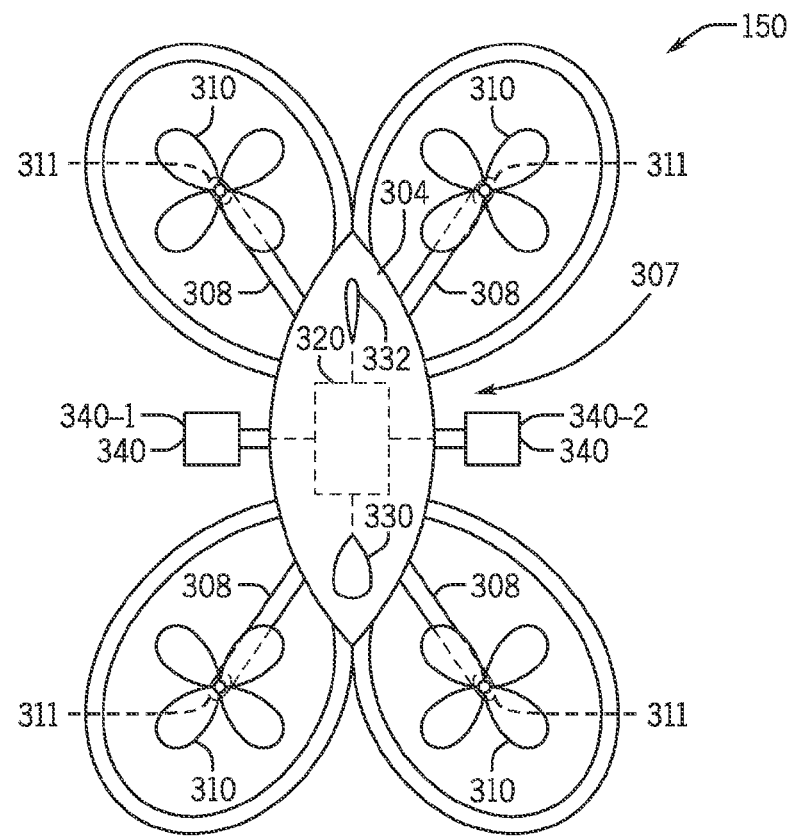
FIG. 3A is a top view of a propeller lift-based unmanned airborne vehicle according to an example implementation.

As a more specific example, in accordance with some implementations, the unmanned vehicle 150 may be a vehicle that derives its vertical lift and lateral propulsion from a propeller-based propagation system, such as the vehicle 150 that is depicted in FIG. 3A. Referring to FIG. 3A, as an example, the unmanned airborne vehicle 150 may contain multiple propellers 310 that are driven by corresponding engines 311 (electric motors, for example) of the vehicle 150 for purposes of controlling the vertical lift and/or lateral movement of the vehicle 150.

In general, the unmanned airborne vehicle 150 may include a body 307 and extensions 308 from the body 307 to position the engines 311 and propellers 310, as shown in FIG. 3A. The unmanned airborne vehicle 150 may further include control electronics 320, which may, for example, autonomously control guiding the vehicle 150 along a predetermined flight path; harvesting seismic sensor data; acquiring seismic sensor data; wireless communicating of data to and from the vehicle 150, such as wireless communication to and from the vehicle 150 using Wi-Fi communication; controlling video or still image capture using high definition (HD) cameras 340 (two HD cameras 340-1 and 340-2, for example) and their associated motors; and so forth. As depicted in FIG. 3A, the control electronics 230 may be coupled to a GNSS antenna 330 for purposes of receiving GNSS signal that are encoded with data indicative of the vehicle's location as well as a Wi-Fi antenna 332 for Wi-Fi communication.

As a specific example, in accordance with example implementations, the unmanned airborne vehicle 150 may be a vehicle similar to the AR. Drone, which is available from Parrot.

Figure 3B:
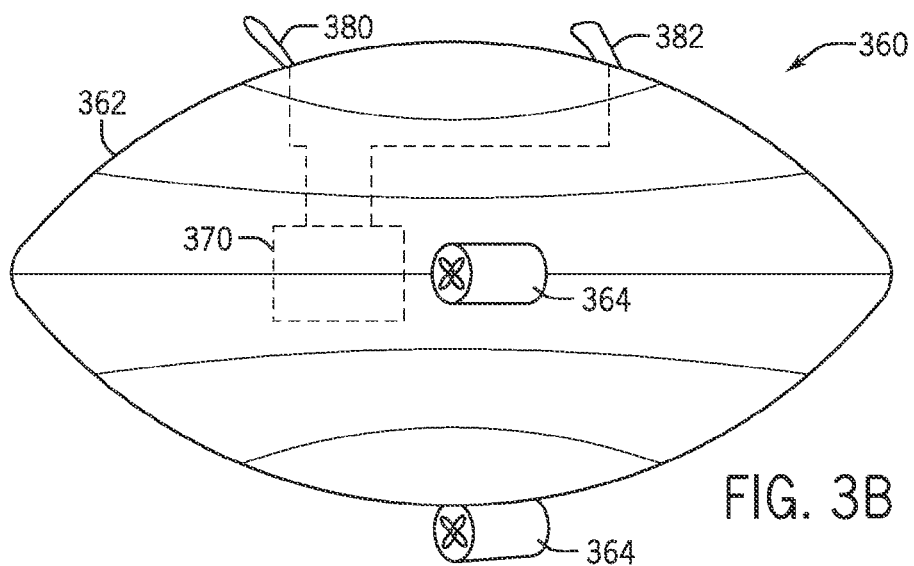
FIG. 3B is a perspective view of a gas lift-based unmanned airborne vehicle according to an example implementation.

The unmanned airborne vehicle may take on other forms, in accordance with further implementations. For example, FIG. 3B depicts an unmanned airborne vehicle 360, which achieves its vertical lift using buoyancy achieved from a lighter than air gas that is stored inside a body 362 of the vehicle 362. In this regard, the body 362 may contain a bladder or balloon that is filled with helium, in accordance with an example implementation. In general, lateral maneuvering of the unmanned airborne vehicle 360 as well as controlled vertical positioning may be achieved using, for example, propeller-based thrusters 364 (distributed below and on both sides of the body 362, for example) and wings/rudders (not shown), which are controlled by control electronics 370 of the vehicle 360. Similar to the unmanned airborne vehicle 150 of FIG. 3A, control electronics 370 may control operation of the unmanned airborne vehicle 360 and its communication. Among its other features, as depicted in FIG. 3B, the unmanned airborne vehicle 360 may contain a GNSS antenna 380, as well as a Wi-Fi antenna 382.

Figure 4:
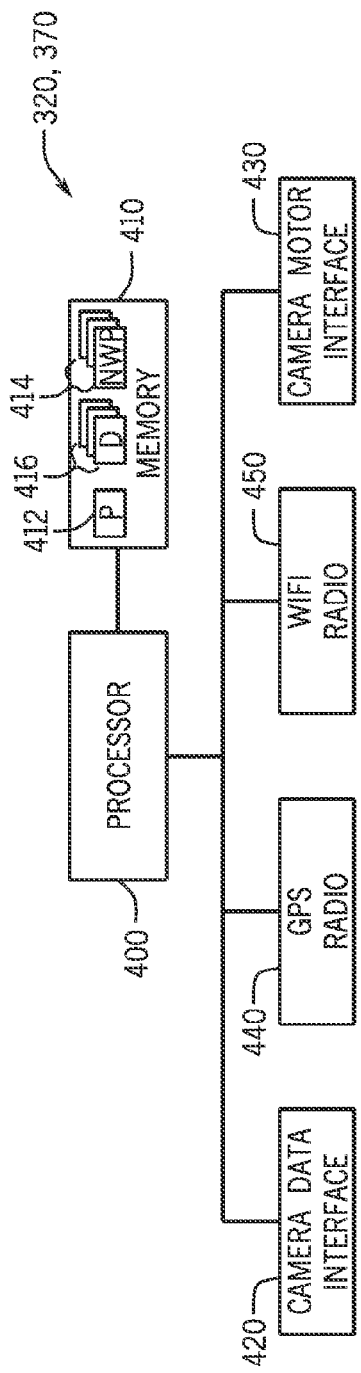
FIG. 4 is a schematic diagram of a control system architecture of the unmanned airborne vehicle according to an example implementation.

FIG. 4 depicts an example implementation of the control electronics 320, 370. As depicted in FIG. 4, the control electronics 320, 370 may contain a processor 400, which schematically represents one or more central processing units (CPUs), microcontrollers, processing cores, field programmable gate arrays (FPGAs), and so forth. In general, the processor 400 may be in communication with a flight control system 460 of the electronics 320, 370 for purposes of autonomously controlling the flight of the unmanned airborne vehicle 150, 360 according to a predetermined flight plan, which is programmed into the vehicle's memory 410.

In this regard, the flight control system 460, in general, includes controls for controlling actuators of the vehicle's propulsion system; sensors (to monitor the vehicle's position, actuator positions, the ambient environment, etc.); and other equipment to control the flight of the unmanned airborne vehicle 150, 360, as can be appreciated by the skilled artisan. The processor 400 may also be in communication with a GNSS radio 440 of the vehicle 150 for purposes of receiving information related to the GNSS coordinates of the vehicle 150. Moreover, the control electronics 320, 370 may include other features, such as a Wi-Fi radio 450, a camera motor interface 430 for purposes of acquiring directed photographs by the vehicle 150 (as further disclosed herein), and a camera data interface 420 for purposes of acquiring data indicative of still and/or video images.

In general, the memory 410 is a non-transitory storage medium that may be formed from semiconductor storage devices, optical storage devices, magnetic-based storage devices, a combination of such devices; and so forth. Moreover, the memory 410 may be removable memory-card based memory; a Universal Serial Bus (USB) drive-based memory; dual inline memory module (DIMM)-based memory; a synchronous dynamic random access memory (SDRAM); a flash memory; a combination of two or more of these memory technologies; and so forth, as can be appreciated by the skilled artisan.

As depicted in FIG. 4, the memory 410 may store a variety of different data, such as program instructions 412, which are executed by the processor 400 to perform one or more of the techniques that are disclosed herein; datasets 416 containing data to be communicated to and/or from the sensor nodes, as further disclosed herein; data representing navigation waypoints 414; and other data, which can be appreciated by the skilled artisan in view of the present application.

Although FIG. 1 depicts a specific land-based seismic acquisition system, the unmanned airborne vehicle may be used in connection with other seismic acquisition systems, in accordance with further implementations. In this manner, the unmanned airborne vehicle may be used in connection with a marine-based seismic acquisition system, in accordance with further implementations.

Figure 5:
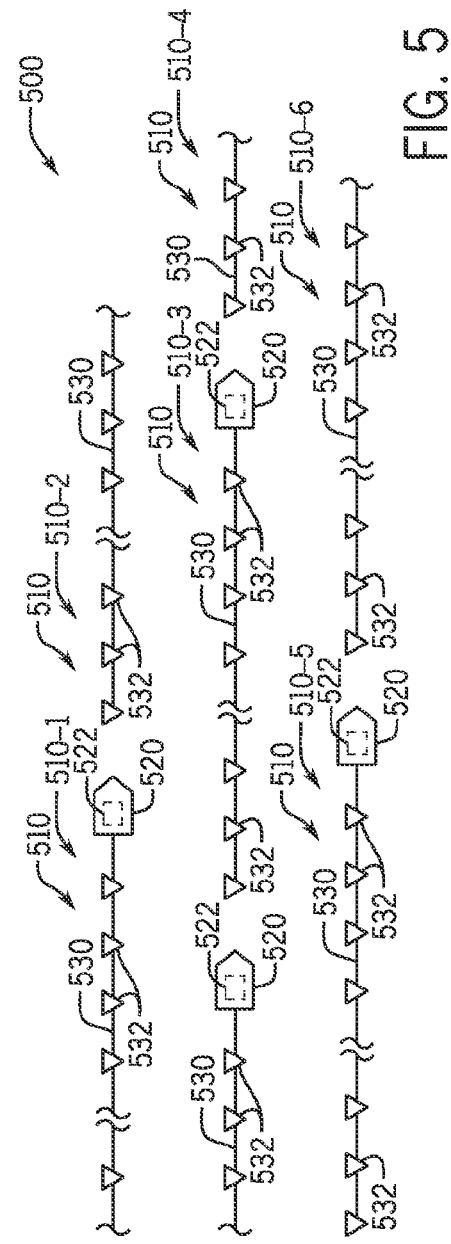
FIG. 5 is a schematic view of a marine-based towed seismic acquisition system using autonomous surface vessels (ASVs) according to an example implementation.

As a more specific example, FIG. 5 depicts a towed marine-based seismic acquisition system 500 in accordance with an example implementation. The seismic acquisition system 500 is formed from autonomous surface vessels (ASVs) 520 (i.e., unmanned surface vessels), which tow respective streamers 530. It is noted that although streamers 530 are depicted in FIG. 5 and described herein, the ASVs 520 may tow other sensor packages for mapping fossil fuel/hydrocarbon reservoirs, in accordance with further implementations. For the specific example depicted in FIG. 5, the streamers 530 may contain receiver nodes 532 (nodes 532 containing one or more geophones and/or hydrophones, as well as other associated circuitry). Instead of communicating with the receiver nodes 532, the unmanned airborne vehicle may wirelessly communicate with electronics 522 on each ASV 520. In this regard, the electronics 520 may be in communication with the corresponding antennae for purposes of communicating over a Wi-Fi connection with an unmanned airborne vehicle that is within Wi-Fi communication range, as further disclosed herein. The use of autonomously and remotely operated vehicles to conduct seismic surveys is described further in PCT Publication No. WO 2012/036814 A2, which published on Mar. 22, 2012, and is hereby incorporated by reference in its entirety.

The unmanned airborne vehicle may communicate with other marine-based acquisition systems, as well as other land-based acquisition systems, in accordance with further implementations. For example, the systems and any techniques that are disclosed herein may be applied to communicating with a well-based acquisition system or an ocean bottom cable (OBC)-based acquisition system, in accordance with further implementations. Thus, many implementations are contemplated, which are within the scope of the intended claims.

Figure 6:
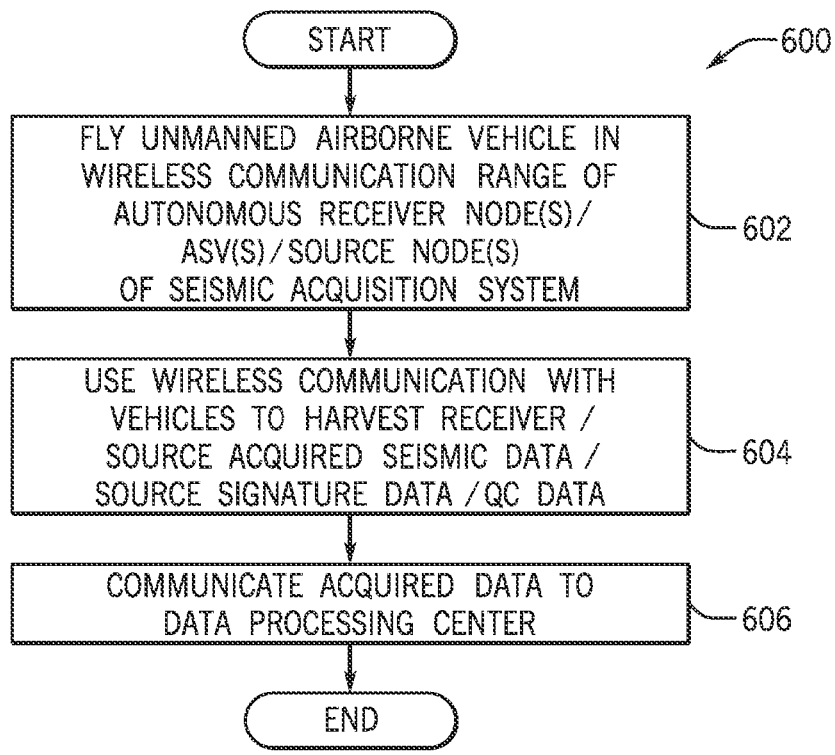
FIG. 6 is a flow diagram depicting a technique to harvest seismic data acquired by a seismic acquisition system according to an example implementation.

Turning now to specific examples illustrating the potential uses of the unmanned airborne vehicle in connection with a seismic acquisition system, FIG. 6 depicts a technique 600 for using in an unmanned airborne vehicle for purposes of data harvesting. Pursuant to the technique 600, the unmanned airborne vehicle is flown (block 602) in wireless communication range of a seismic acquisition system, such as within wireless communication range of autonomous receiver nodes, autonomous surface vessels, or source nodes of a seismic acquisition system. The technique 600 includes using wireless communication with the vehicle to harvest receiver or source acquired seismic data; source signature data; or quality control data and then communicating (block 606) the acquired data to a data processing center. In this regard, the unmanned airborne vehicle may be used with a cable-free blind seismic acquisition system, such as an acquisition system that uses Geospace Sensor Recorders (GSRs) from OYO Geospace, for example. Thus, the unmanned airborne vehicle may be flown to seismic sensor nodes in the cable-free blind system to wirelessly collect data from each node.

Depending upon the particular implementation, the harvested data may be full seismic data, i.e., the particle motion/pressure data acquired by the seismic sensor(s) of the node. However, in further implementations, the data may or may not contain full seismic data and may include quality control (QC) data. In this regard, the QC data may be data indicative of signal-to-noise ratios (SNRs) determined by the node and so forth. In yet further implementations, the harvested data may contain full seismic data and QC data. In accordance with some implementations the QC data may be used to monitor the quality of the seismic data being acquired during a seismic survey so that corrective action may be undertaken, as described in PCT Publication No. WO 2012/044479 A2, which published on Apr. 5, 2012, and is hereby incorporated by reference in its entirety.

In some implementations, the unmanned airborne vehicle may acquire signature source data from seismic sources, such as vibrator trucks of the seismic acquisition system. In this regard, the vehicle may be used to harvest client deliverables on a daily basis, such as vibrator source signature data, particularly in difficult terrains, in accordance with example implementations.

The data harvested by the unmanned airborne vehicle may be communicated back to the data processing center (pursuant to block 606 of FIG. 6) in a variety of different ways, depending on the particular implementation. For example, in accordance with some implementations, the unmanned airborne vehicle may store the harvested data in its internal memory so that when the vehicle completes harvesting data from the seismic acquisition system, the vehicle may return to the data processing center (via programmed navigation waypoint(s)) where the data may be downloaded from the vehicle. This downloading may, for example, involve wirelessly communicating with the vehicle, removing a removable media card from the vehicle, attaching a cable to a communication connector of the vehicle, and so forth.

In further implementations, the harvested data may be communicated back to the data processing center using a wireless access point (a Wi-Fi access point or a fifth generation (5G) cellular access point, as examples) at or near the seismic acquisition system. For example, in accordance with some implementations, the vehicle may harvest the data by flying from node-to-node of the seismic acquisition system and then fly to a designated communication point for purposes of wirelessly communicating (via a Wi-Fi connection, for example) the collected data back to the data processing center. Thus, many variations are contemplated, which are within the scope of the intended claims.

It is noted that although wireless communications are disclosed herein which use radio-based signaling, other types of communications may be used in accordance with further implementations. For example, in accordance with further implementations, the unmanned airborne vehicle may employ such wireless communication signaling as optical link signaling (laser signaling, for example) and contain the appropriate communication devices (lasers, for example) for this signaling. The communication between the unmanned airborne vehicle and another entity, such as an access point, may occur in ways other than ways that involve wireless signaling. For example, in accordance with further implementations, the unmanned airborne vehicle may communicate using a tethered aerostat (a moored balloon-based platform), for example or may communicate using physical contact-based connection with the other entity. Thus, many implementations are contemplated, which are within the scope of the appended claims.

Figure 7A:
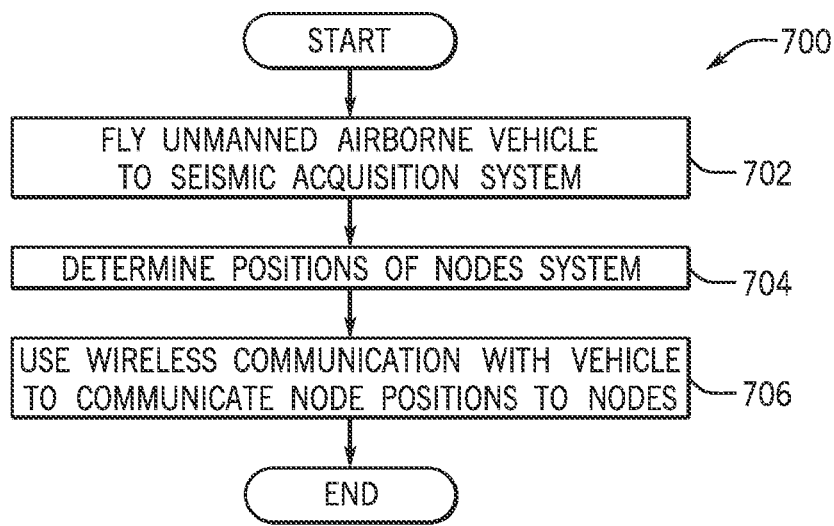
FIGS. 7A, 7B, 7C, 7D, and 7E are flow diagrams depicting techniques to use an unmanned airborne vehicle to communicate node positions to sensor nodes of a seismic acquisition system according to example implementations.

The unmanned airborne vehicle may also be used, in accordance with further implementations, for purposes of communicate node positions to the sensor and/or source nodes. In this manner, referring to FIG. 7A, in accordance with example implementations, a technique 700 includes flying (block 702) an unmanned airborne vehicle to a seismic acquisition system; determining (block 704) positions of nodes of the system; and using wireless communication with the vehicle to communicate the node positions to the nodes, pursuant to block 706. For example, the unmanned airborne vehicle may be used to inject sensor positions into corresponding sensor nodes. Assuming that an unmanned airborne vehicle is equipped with a GNSS radio that has a sufficient accuracy, the vehicle may fly to each sensor node one by one and inject the associated sensor position wirelessly (via Wi-Fi communication, for example); or, in accordance with further implementations, the unmanned airborne vehicle may fly near or at the Wi-Fi radio for each designed group of nodes and inject the sensor positions for that group wirelessly.

Figure 7B:
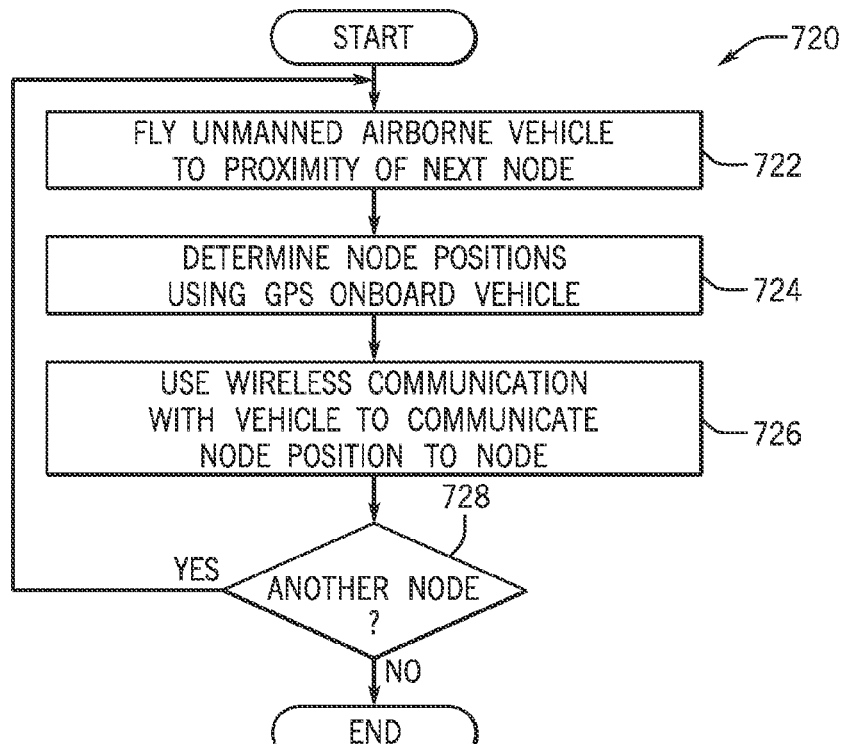

Thus, referring to FIG. 7B, a technique 720 in accordance with example implementations includes flying in an unmanned airborne vehicle within proximity to the next sensor node, pursuant to block 722. In this regard, within or in proximity refers to being within a range sufficient to establish Wi-Fi communication with the node. The technique 720 further includes determining (block 724) the node position using at least a GNSS radio. In this regard, block 724 may be performed onboard the vehicle by using the GNSS coordinates acquired by the onboard GNSS radio of the vehicle. Other implementations are contemplated, however. For example, in accordance with some implementations, the vehicle may determine the sensor node position by triangulating the node position from known positions from one or more other nodes. As another example, a node position may be determined by acquiring a node position provided by the node and further refining the position using GNSS-based calculations. Thus, many variations are contemplated and are within the scope of the intended claims.

Regardless of the particular technique that is used to determine node position, the technique 720 includes using wireless communication with the vehicle to communicate the position of the node to the node, pursuant to block 726. If a determination is made (pursuant to decision block 728) that another node is to be injected with its position, control returns to block 722 to process the next node.

Figure 7C:
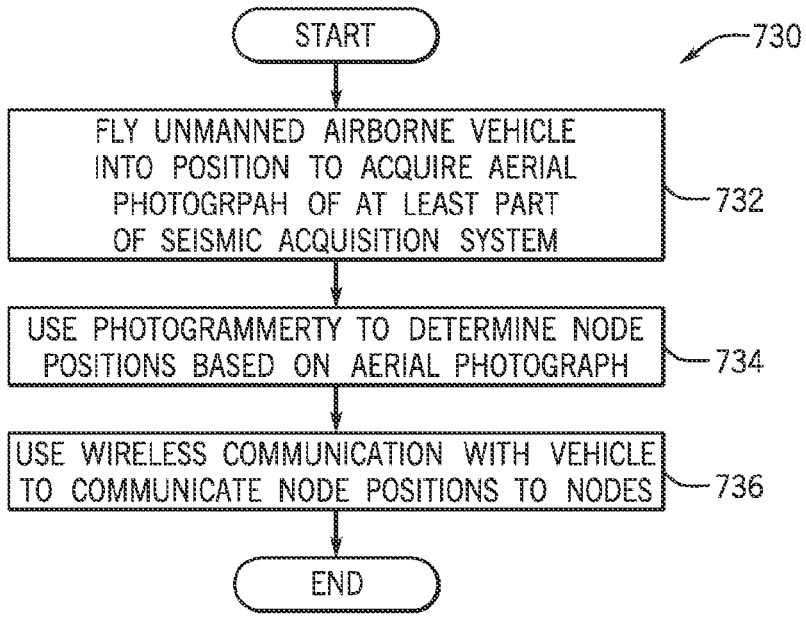

The node positions may be determined, in accordance with further implementations, using photogrammetry. In this manner, FIG. 7C depicts another technique 730 for injecting nodes with their positions. Pursuant to the technique 730, an unmanned airborne vehicle is flown, pursuant to block 732, into position to acquire an aerial still image, or photograph, of at least part of a seismic acquisition system (i.e., a part of an array of sensor nodes). The technique 70 includes using (block 734) photogrammetry to determine the positions of the nodes based on the aerial photograph and using (block 736) wireless communication with the unmanned airborne vehicle to communicate the node positions to the nodes. In this regard, the photogrammetry involves calculating the node positions using a few known node positions (positions obtained using GNSS, using reference positions, and so forth). This calculation may be performed either onboard the unmanned airborne vehicle or may be performed remotely by another remotely disposed system.

Figure 7D:
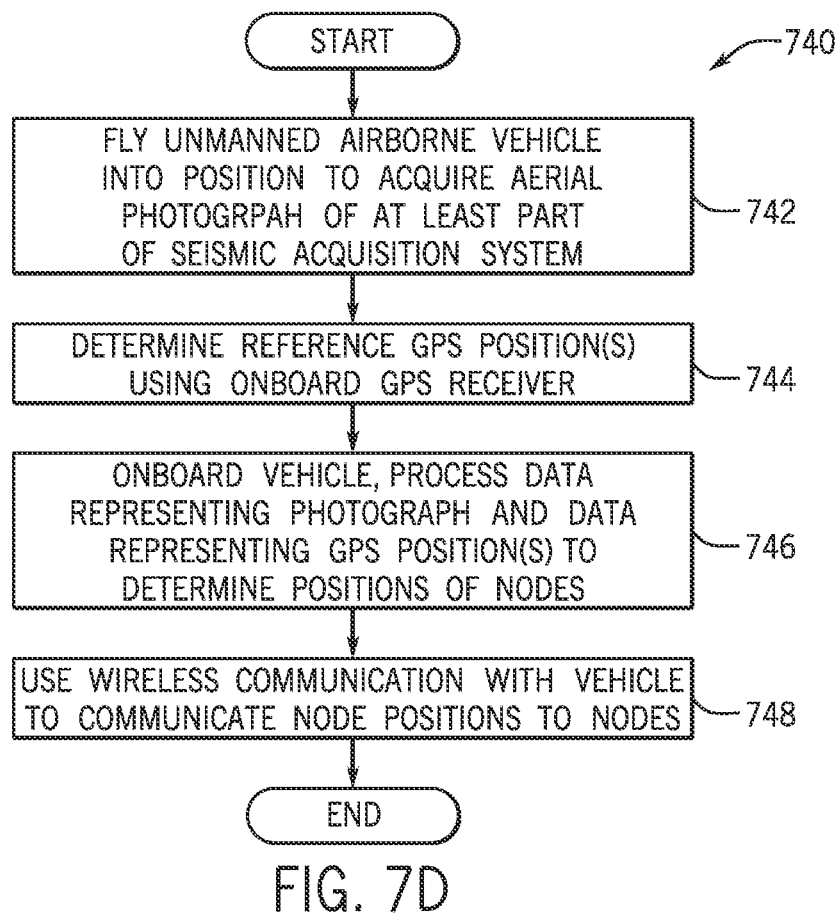

In this manner, FIG. 7D depicts a technique 740 that includes flying an unmanned airborne vehicle into position to acquire an aerial still image, or photograph, of at least part of a seismic node-based system, pursuant to block 742. The technique 740 includes determining (block 744) one or more reference GNSS positions, using, for example, an onboard GNSS receiver on the vehicle, pursuant to block 744. The technique 740 includes the vehicle processing (block 746) data representing the photograph and data representing the GNSS position(s) to determine the positions of the nodes in the aerial photograph using photogrammetry. The technique 740 further includes using wireless communication with the unmanned airborne vehicle to communicate the node positions to the nodes, pursuant to block 748.

Figure 7E:
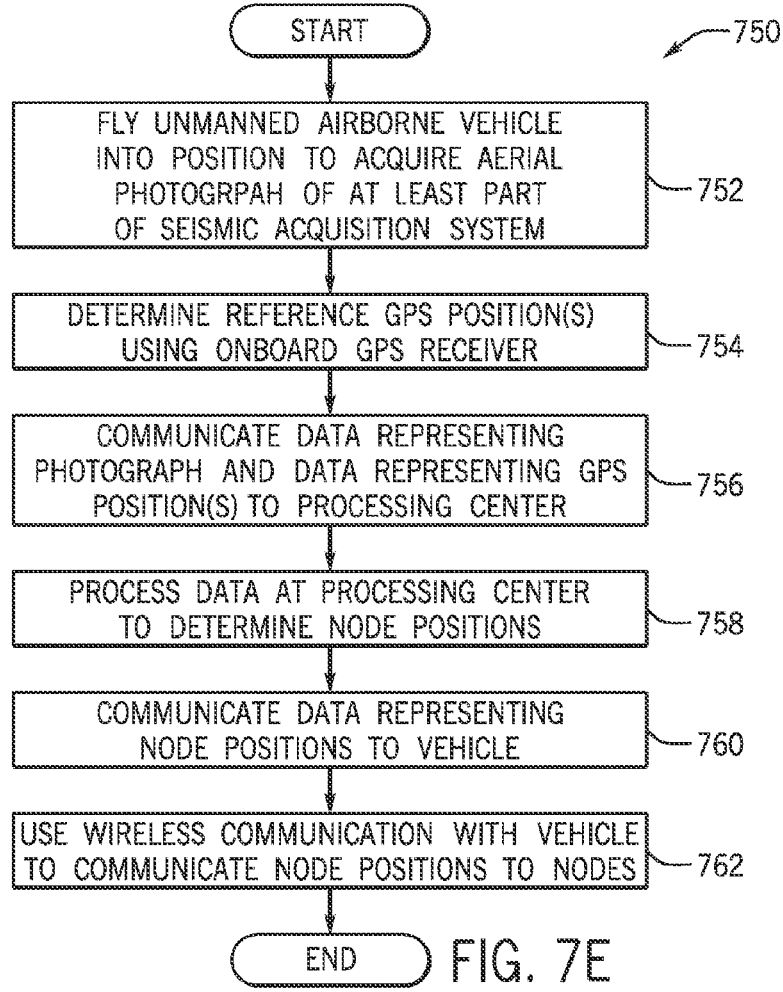

In further implementations, a technique 750 that is depicted in FIG. 7E includes using offboard processing for purposes of determining the node positions. In this manner, the technique 750 includes flying (block 752) an unmanned airborne vehicle into a position to acquire an aerial still image, or photograph, of at least part of a seismic acquisition system and determining (block 754) at least one GNSS position. Data representing the photograph and the GNSS position(s) are then communicated (block 756) from the vehicle to a processing center, where the data is processed (block 758) to determine node positions. The determined node positions may then be communicated back to the unmanned airborne vehicle, pursuant to block 760, so that the vehicle may be used to use wireless communication to communicate the node positions to the nodes, pursuant to block 762.

It is noted that the techniques depicted above in connection with FIGS. 7A-7E may be used for purposes of injecting positions for nodes, whether the nodes are located on a land-based seismic acquisition system or located on a marine-based seismic acquisition system. Moreover, in accordance with the further implementation, the above-described techniques may be used for purposes of determining the positions of ASVs and communicating these determined positions to the ASVs. This, many implementations are contemplated, which are within the scope of the intended claims.

In accordance with some implementations, when a problem is reported and/or detected with a seismic acquisition system, an unmanned airborne vehicle may be flown over/near the area where the problem is reported or detected for purposes of communicating live, or real time, audio, visual and/or audiovisual feedback to a remote observer. In this manner, a live video feed, for example, may be beneficial for purposes of troubleshooting issues, particularly issues associated with difficult terrains or third party interferences. Thus, in general, in accordance with example implementations, the unmanned airborne vehicle may be used to communicate data that represents a "situation awareness" of at least part of a seismic acquisition system. This "situation awareness" may be communicated in the form of audio information, video information, and so forth, depending on the particular example implementation.

Figure 8:
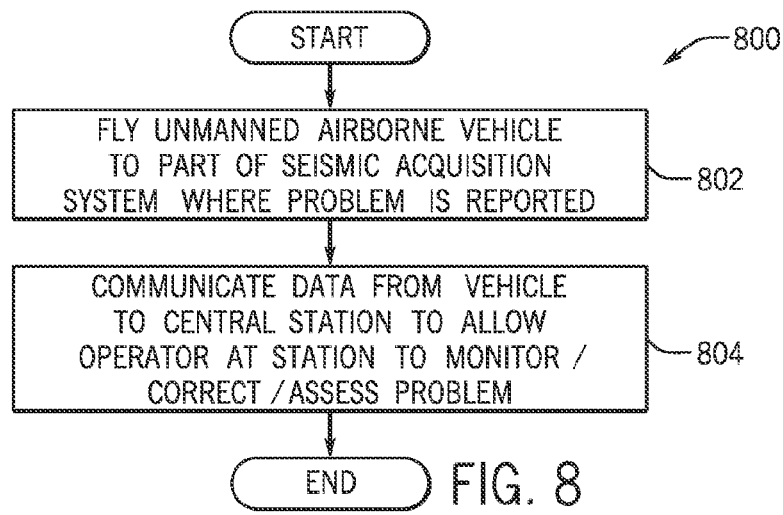
FIG. 8 is a flow diagram depicting a technique to use an unmanned airborne vehicle to perform troubleshooting operations with a seismic acquisition system according to an example implementation.

More specifically, as an example, if communication is lost with an ASV during a marine swarm survey, the unmanned airborne vehicle may be used to monitor the location of the ASV, which may greatly reduce the risk for an accident in the swarm survey. Thus, pursuant to a technique 800 that is depicted in FIG. 8, an unmanned airborne vehicle may be flown (block 802) to part of a seismic acquisition system where a problem is reported and/or detected. Data may then be communicated from the vehicle to a central station to allow an operator at the station to monitor, correct and/or assess the problem, pursuant to block 804.

The unmanned airborne vehicle may be used for other purposes, in accordance with further implementations. For example, in accordance with some implementations, the vehicle may be used to form part of a sensor array for a land seismic acquisition. More specifically, in accordance with some implementations, the unmanned airborne vehicle may contain a seismic sensor or group of seismic sensors (a hydrophone, one or more geophones, and so forth), which may be deployed on the vehicle. In this manner, the unmanned airborne vehicle may be flown to a predetermined position that is associated with a target location for a given sensor node for a land-based seismic survey. The use of the vehicle's camera and/or GNSS receiver-based positioning may be used to precisely position the vehicle, as well as avoid collisions and achieve proper coupling. The camera feedback may be automated using image processing techniques, in accordance with some example implementations. The wireless communications may then be used in connection with the landed unmanned airborne vehicle for purposes of starting and stopping the acquisition of the seismic data by the vehicle's seismic sensor(s). The acquired seismic data may be communicated back to a remotely disposed central station or physically carried (on a removable media card or other memory of the vehicle, for example) back to the central station for data collection.

Figure 9:
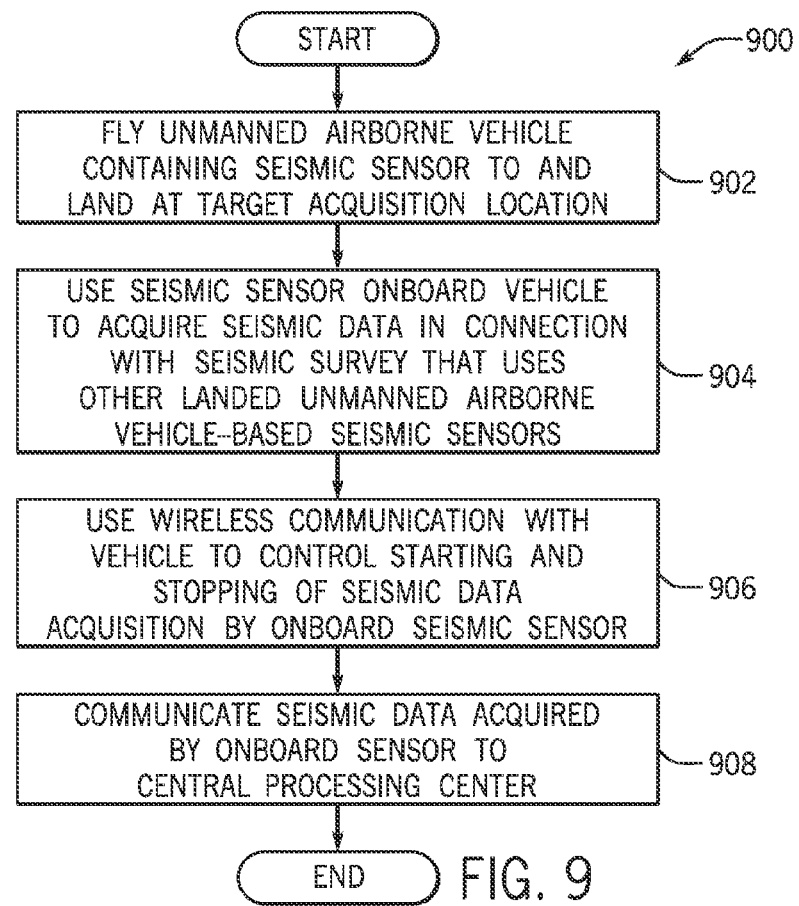
FIG. 9 is a flow diagram depicting a technique to use an unmanned airborne vehicle to form part of a land-based seismic acquisition system according to an example implementation.

Thus, referring to FIG. 9, in accordance with an example implementation, a technique 900 includes flying (block 902) an unmanned airborne vehicle containing a seismic sensor to a target acquisition location and landing the vehicle at target acquisition location. A seismic sensor onboard the vehicle may then be used, pursuant to block 904, to acquire seismic data in connection with a seismic survey that uses other such unmanned vehicle-based seismic sensors. Wireless communication may also be employed with the unmanned airborne vehicle, pursuant to block 906, to control the starting and stopping of the seismic data acquisition by the onboard sensor. The seismic data may then be communicated (block 908) to a central processing center, as described above.

Other variations are contemplated, which are within the scope of the appended claims. For example, in accordance with further example implementations, an unmanned airborne vehicle may be used to deploy a seismic sensor that is part of a sea surface-based seismic acquisition system or network. In this manner, in accordance with further example implementations, a technique includes flying an unmanned airborne vehicle to a location (a predefined location, for example) on a sea surface and deploying a seismic sensor from the unmanned airborne vehicle to record a reflected signal from a seismic source (a towed seismic source, for example). As a more specific example, in accordance with some implementations, the deployed seismic sensor may be a cable-connected seismic sensor, which is connected by a cable and thus, towed by, the unmanned airborne vehicle. In further implementations, the deployed seismic sensor may be a sensor that wirelessly communicates with the unmanned airborne vehicle.

The unmanned airborne vehicle may be used in accordance with further implementations for purposes of marine seismic acquisition. In this manner, such aspects as seismic data collection, quality control (QC) collection and delivery may be carried out by the vehicle, depending on the particular implementation. Data collection conducted by the unmanned airborne vehicle near an ASV may reduce the risk otherwise associated with physically retrieving the ASV and downloading the data. Additionally, acquiring the data using the vehicle may result in obtaining the data sooner in relation to the start time of the survey. The QC data may also be harvested by the unmanned airborne vehicle by positioning the vehicle to be in close proximity to a swarm of the ASVs (in sufficient proximity for Wi-Fi communications with Wi-Fi radios onboard the ASVs, for example). In situations when normal communications technology does not function as planned or as a substitute for a conventional communication system, information may be relayed to a given ASV via an unmanned airborne vehicle.

In accordance with some implementations, the unmanned airborne vehicle may land on a given ASV, such as land on a dedicated landing surface of the ASV.

Figure 10:
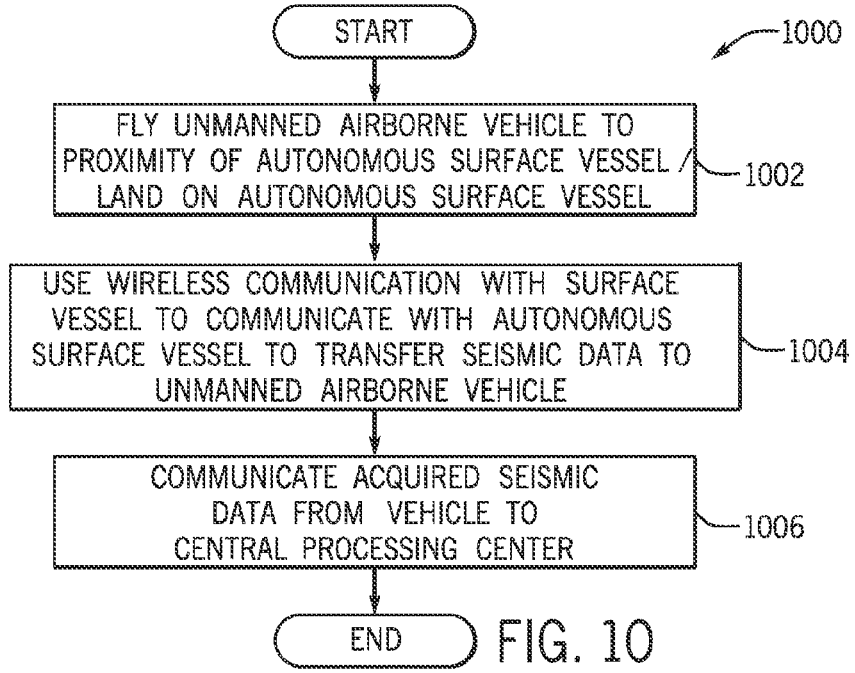
FIG. 10 is a flow diagram depicting a technique to use an unmanned airborne vehicle with a marine-based seismic acquisition system according to an example implementation.

Thus, referring to FIG. 10, in accordance with example implementations, a technique 1000 includes flying (block 1002) an unmanned airborne vehicle to proximity of an ASV or landing the vehicle on the ASV. Pursuant to the technique 1000, wireless communication may be used (block 1004) with the ASV to communicate with the ASV to transfer data (seismic data, quality control data, and so forth) to the unmanned airborne vehicle so that the acquired data may be communicated (block 1006) from the unmanned airborne vehicle to a central processing center.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A system comprising:
   a seismic acquisition system, comprising a plurality of nodes; and
   an unmanned airborne vehicle to be used with the seismic acquisition system to conduct a seismic survey, wherein the unmanned airborne vehicle comprises:
   a radio to wirelessly communicate with the plurality of nodes; and
   a processor to use the radio to communicate positions of the nodes to the nodes.

2. The system of claim 1, wherein the processor is adapted to use the radio to harvest data from the nodes.

3. The system of claim 2, wherein the processor is adapted to use the radio to communicate with the nodes to harvest seismic acquisition data from at least one of the nodes, quality control data from at least one of the nodes, and/or transmit a video feed of at least part of the seismic acquisition system.

4. The system of claim 1, wherein the processor is adapted to determine the positions of the nodes.

5. The system of claim 4, wherein the processor is adapted to use the radio to communicate the determined positions to the nodes and/or communicate the determined positions to a location other than a location local to the seismic acquisition system.

6. The system of claim 1, wherein the seismic acquisition system comprises an autonomous surface vessel, and the radio is adapted to communicate with the autonomous surface vessel.

7. A system comprising:
a land-based seismic acquisition system; and
an unmanned airborne vehicle comprising a seismic sensor and adapted to fly to a position to deploy the sensor on a land surface such that the deployed sensor forms an acquisition point of the land-based seismic acquisition system.

8. The system of claim 7, wherein the unmanned airborne vehicle is further adapted to respond to commands to control at least one of starting and stopping of seismic data acquired by the sensor.

9. A method comprising:
flying an unmanned airborne vehicle in proximity to a seismic acquisition network; and
using the unmanned airborne vehicle to communicate with at least one node of the seismic acquisition network, wherein using the unmanned airborne vehicle comprises using the unmanned airborne vehicle to communicate a position of the least one node of the seismic acquisition network to the at least one node.

10. The method of claim 9, wherein using the unmanned airborne vehicle to communicate with the at least one node comprises using Wi-Fi communication.

11. The method of claim 9, wherein using the unmanned airborne vehicle to communicate comprises communicating seismic data acquired by the seismic acquisition network, quality control information provided by the seismic acquisition network, and/or data representing situation awareness of at least part of the seismic acquisition network.

12. The method of claim 9, further comprising using processing onboard the unmanned airborne vehicle to determine the position of the at least one node.

13. The method of claim 9, further comprising using a Global Navigation Satellite System (GNSS) radio of the unmanned airborne vehicle in a determination of the position of the at least one node.

14. The method of claim 9, wherein using the unmanned airborne vehicle to communicate with the seismic acquisition network comprises communicating with an autonomous surface vessel of the system.

15. The method of claim 9, wherein the seismic acquisition network comprises a land-based seismic acquisition network or a marine-based seismic acquisition network.

16. A method comprising:
flying an unmanned airborne vehicle to a location on a sea surface;
deploying a cable-connected seismic sensor from the unmanned airborne vehicle to record a reflected signal from a seismic source; and
operating the unmanned airborne vehicle to tow the cable-connected seismic sensor in association with a seismic acquisition.

17. A system comprising:
a seismic acquisition system, comprising a plurality of nodes; and
an unmanned airborne vehicle to be used with the seismic acquisition system to conduct a seismic survey, wherein the unmanned airborne vehicle comprises:
at least one sensor; and
a radio to provide real time feedback of data acquired by at least a portion of the seismic acquisition system to a remote processing center.

\* \* \* \* \*